(12) United States Patent
Han

(10) Patent No.: US 12,352,618 B2
(45) Date of Patent: Jul. 8, 2025

(54) DEMODULATION OF FIBER OPTIC SENSORS

(71) Applicant: Board of Trustees of Michigan State University, East Lansing, MI (US)

(72) Inventor: Ming Han, Okemos, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 613 days.

(21) Appl. No.: 17/702,130

(22) Filed: Mar. 23, 2022

(65) Prior Publication Data

US 2022/0326069 A1 Oct. 13, 2022

Related U.S. Application Data

(60) Provisional application No. 63/173,831, filed on Apr. 12, 2021.

(51) Int. Cl.
*H01H 9/00* (2006.01)
*G01D 5/353* (2006.01)
(Continued)

(52) U.S. Cl.
CPC ......... *G01H 9/004* (2013.01); *G01D 5/35306* (2013.01); *G02B 6/4215* (2013.01); *H04B 10/503* (2013.01); *H04B 10/564* (2013.01)

(58) Field of Classification Search
CPC .. G01H 9/004; G01D 5/35306; G02B 6/4215; H04B 10/503; H04B 10/564; H04J 14/0221
(Continued)

(56) References Cited

U.S. PATENT DOCUMENTS 5,319,435 A 6/1994 Melle et al.
7,027,136 B2 4/2006 Tsai et al.
(Continued)

FOREIGN PATENT DOCUMENTS

CA 2311795 C * 8/2007 ......... G01D 5/35383
CN 104660338 A * 5/2015
KR 101334364 B1 * 12/2013

OTHER PUBLICATIONS

Machine Translation of KR 101334364 B1 (Year: 2013).*
(Continued)

*Primary Examiner* — Herbert K Roberts
(74) *Attorney, Agent, or Firm* — Harness, Dickey & Pierce PLC

(57) ABSTRACT

A system, apparatus, and method for demodulation of a fiber optic sensor is provided. An aspect of the system provides an optical fiber, a laser, a phase modulator configured to be coupled to the optical fiber, and a sensor. The laser emits a laser beam into the optical fiber. The phase modulator receives the laser beam from the laser and directs the laser beam to the sensor. The sensor includes a coiled portion of the optical fiber, uncoiled segments adjacent the coiled portion, and at least two fiber Bragg gratings configured to be coupled to opposite uncoiled segments adjacent the coiled portion of the optical fiber. The sensor system may further include a photodetector configured to receive a reflected portion of the laser beam from the sensor. The reflected portion is divided into at least two paths where at least two sub-outputs are generated for demodulation and sensing.

26 Claims, 4 Drawing Sheets

(51) Int. Cl.
*G01H 9/00* (2006.01)
*G02B 6/42* (2006.01)
*H04B 10/564* (2013.01)
*H04J 14/02* (2006.01)
*H04B 10/50* (2013.01)

(58) Field of Classification Search
USPC .......................................................... 73/655
See application file for complete search history.

(56) References Cited

U.S. PATENT DOCUMENTS

| | | | |
|---|---|---|---|
| 8,240,207 | B2 | 8/2012 | Anderson et al. |
| 9,146,095 | B2 | 9/2015 | Tsuda |
| 9,726,645 | B2 | 8/2017 | Soejima et al. |
| 9,983,005 | B1 | 5/2018 | Biren |
| 10,024,756 | B2 | 7/2018 | Da Silva et al. |
| 10,033,153 | B1 | 7/2018 | Nguyen et al. |
| 10,234,346 | B2 | 3/2019 | Dong et al. |
| 10,495,610 | B2 | 12/2019 | Cranch |
| 10,520,338 | B2 | 12/2019 | Gruca et al. |
| 10,861,682 | B2 | 12/2020 | O'Banion et al. |
| 2012/0227504 | A1 | 9/2012 | Goldner et al. |
| 2014/0112615 | A1 | 4/2014 | Kreger et al. |
| 2014/0133521 | A1 | 5/2014 | Li et al. |
| 2015/0308864 | A1 | 10/2015 | Paulsson et al. |
| 2016/0076932 | A1 | 3/2016 | Sherman |
| 2016/0209584 | A1 | 7/2016 | Vincelette et al. |
| 2016/0223711 | A1 | 8/2016 | LeBlanc |
| 2017/0130574 | A1 | 5/2017 | Nunes et al. |
| 2017/0131431 | A1 | 5/2017 | Cekorich |
| 2017/0235006 | A1 | 8/2017 | Ellmauthaler et al. |
| 2018/0031413 | A1 | 2/2018 | Stokely et al. |
| 2018/0088357 | A1 | 3/2018 | Kliner et al. |
| 2018/0143041 | A1 | 5/2018 | Johnston |
| 2018/0210105 | A1 | 7/2018 | Stokely |
| 2018/0306936 | A1 | 10/2018 | Jaaskelainen |
| 2018/0313974 | A1 | 11/2018 | Barfoot et al. |
| 2018/0321085 | A1 | 11/2018 | Gruca et al. |
| 2018/0356210 | A1 | 12/2018 | Moore et al. |
| 2019/0017864 | A1 | 1/2019 | Philtron et al. |
| 2019/0169985 | A1 | 6/2019 | Dickenson et al. |
| 2019/0368904 | A1 | 12/2019 | Soejima et al. |
| 2020/0033186 | A1 | 1/2020 | Yang et al. |
| 2020/0249075 | A1 | 8/2020 | Ma et al. |
| 2020/0386610 | A1 | 12/2020 | Foster |
| 2021/0033452 | A1 | 2/2021 | Jin et al. |
| 2021/0333089 | A1 | 10/2021 | Han |

OTHER PUBLICATIONS

Machine Translation of CN 104660338 A (Year: 2015).*
Dandridge, A., et al., "Homodyne Demodulation Scheme for Fiber Optic Sensors Using Phase Generated Carrier," IEEE Transactions on Microwave Theory and Techniques, vol. MTT-30, No. 10, pp. 1635-1641 (Oct. 1982).
Volkov, A. V., et al., "Phase Modulation Depth Evaluation and Correction Technique for the PGC Demodulation Scheme in Fiber-Optic Interferometric Sensors," IEEE Sensors Journal, vol. 17, No. 13, pp. 4143-4150 (Jul. 1, 2017).
Lin, Q., et al., "A high-resolution fiber optic accelerometer based on intracavity phase-generated carrier (PGC) modulation," Measurement Science and Technology, vol. 22 (2011).
Mao, X, et al., "Characteristics of a fiber-optical Fabry-Perot interferometric acoustic sensor based on an improved phase-generated carrier-demodulation mechanism," Optical Engineering, vol. 54(4) (Apr. 2015).
Wang, D., et al., "Fiber optic extrinsic Fabry-Perot accelerometer using laser emission frequency modulated phase generated carrier demodulation scheme," Optical Engineering, vol. 52(5) (May 2013).
Zhang, S., et al., "Real-time normalization and nonlinearity evaluation methods of the PGC-arctan demodulation in an EOM-based sinusoidal phase modulating interferometer," Optics Express, vol. 26, No. 2 (Jan. 22, 2018).
Wang, L., et al., "The arctangent approach of digital PGC demodulation for optic interferometric sensors," Proceedings of Spie, vol. 62921E (Aug. 14, 2006).
Tong, Y., et al., "Improved phase generated carrier demodulation algorithm for eliminating light intensity disturbance and phase modulation amplitude variation," Applied Optics, vol. 51, No. 29, pp. 6962-6967(Oct. 10, 2012).
Zhang, S., et al., "Eliminating Light Intensity Disturbance With Reference Compensation in Interferometers," IEEE Photonics Technology Letters, vol. 27, No. 17 (Sep. 1, 2015).
Karim, F., et al., "Modified phase-generated carrier demodulation of fiber-optic interferometric ultrasound sensors," Optic Express, vol. 29, No. 16 (Aug. 2, 2021).

* cited by examiner

DEMODULATION OF FIBER OPTIC SENSORS

CROSS-REFERENCE TO RELATED APPLICATIONS

The present application claims priority to U.S. Provisional Patent Application Ser. No. 63/173,831 filed on Apr. 12, 2021, which is incorporated by reference herein.

GOVERNMENT SUPPORT CLAUSE

This invention was made with government support under N00014-18-1-2273 and under N00014-18-1-2597 awarded by the U.S. Office of Naval Research. The government has certain rights in the invention.

BACKGROUND

The present application relates generally to a demodulation system and more particularly to a system that demodulates a fiber optic interferometric sensor for vibration, infrasonic, sonic, or ultrasonic sensing.

Fiber optic sensors utilizing various optical interferometers or fiber Bragg gratings ("FBGs") that sense temperature, strain, pressure and refractive index are generally known. An FBG-type of Fabry-Perot interferometer used to detect ultrasound was disclosed in commonly invented U.S. Provisional Patent Application No. 63/016,319 entitled "Demodulation of Fiber Optic Interferometric Sensors" filed on Apr. 28, 2020. Additionally, construction of FBG-type sensors and use of these sensors for structural health monitoring are described in U.S. Pat. No. 10,024,756 entitled "Method and System for Structural Health Monitoring with Frequency Synchronization" issued to Da Silva et al. on Jul. 17, 2018; U.S. Pat. No. 7,027,136 entitled "Structure Analysis and Defect Detection System" issued to Tsai et al. on Apr. 11, 2006; and U.S. Pat. No. 5,319,435 entitled "Method and apparatus for Measuring the Wavelength of Spectrally Narrow Optical signals" issued to Melle et al. on Jun. 7, 1994. These patent applications and patents are all incorporated by reference herein. While the commonly invented patent application is a significant advance in the industry, further improvements are now desirable.

Fiber optic sensors have been used for various sensing applications, such as strain and temperature measurements, nondestructive evaluation, and structural health monitoring. The information measured is encoded as the phase modulation of the spectral fringes of a sensor. The optical phase change manifests itself as a spectral shift of the fringes. For measurement of dynamic signals, such as sonic and ultrasound, the spectral shift is small compared to the width of the fringes. Traditionally, laser light from a single-frequency laser is emitted to the sensor, power of the laser light reflected from the sensor is measured by a photodetector ("PD"), and a wavelength of the reflected laser light is set at a point on a spectral slope of the fringes. The spectral shift leads to variations of the reflected power of the laser, which are measured by the PD. A change of parameters can modify the spectral shift and, as a result, the change of the parameters can be measured by the spectral shift of the fringes. This so-called "intensity demodulation" has theoretical advantages of low cost and high speed. However, environmental perturbations may undesirably move the operation point to a region with significantly reduced slope on the spectrum. Additionally, the sensors may be highly directional, and require expensive, low-noise and wavelength-tunable laser sources with feedback control systems to maintain the operation point on the slope of the fringes.

For sensors whose fringes are approximately sinusoidal, such as those from low-finesse Fabry-Perot interferometers, Mach-Zehnder interferometers, or Michelson interferometers, heterodyne demodulation using a phase-generated carrier may be used to extract the phase of the fringes and, consequently, a signal of interest. In this scheme, either the laser source wavelength or the sensor itself is modulated at a frequency at least twice the highest frequency of the signal of interest to produce the carrier. The laser reflected from the sensor is measured by a PD, and the output of the PD is a sum of infinite series of frequency components at the carrier frequency and its harmonics. The amplitude of a frequency component is proportional to either the cosine (in-phase) or the sine (quadrature) of the phase of the sensor fringes. Heterodyne detection is performed on two appropriate frequency components to extract both the in-phase signal and the quadrature signal by mixing the output from the PD and an oscillation signal of appropriate frequency and phase. The phase of the fringes, which contains the signal of interest, can be reconstructed by a series of operations on the cosine and sine of the phases that involves differentiation, cross-multiplication, summing, and integration. The heterodyne demodulation scheme has the advantages of large dynamic range and good linearity. However, it may lack the sensitivity for detecting small dynamic signals, such as sonic or ultrasound.

SUMMARY

In accordance with the present invention, sensor systems, a sensor apparatus, and a method for demodulation of a fiber optic sensor are provided. An aspect of the sensor system includes an optical fiber, a laser, a phase modulator configured to be coupled to the optical fiber, and a sensor. In another aspect, the sensor includes a coiled portion of the optical fiber, uncoiled segments adjacent the coiled portion of the optical fiber, and at least two FBGs configured to be coupled to opposite uncoiled segments adjacent the coiled portion of the optical fiber. A further aspect includes a PD configured to receive a reflected portion of a laser beam from the sensor. The output of the PD may be divided into at least two paths, such as a first path and a second path, for demodulation and sensing. An additional aspect includes at least one mixer in each of the first path and the second path to generate cosine and sine terms of the phase of the sensor. Yet another aspect employs a first filter, a second filter and an amplifier in each of the first path and the second path to obtain at least four terms for assisting with sensing.

In another aspect of a sensor system, the system employs a plurality of wavelength tunable lasers configured to emit a laser light. A further aspect includes a wavelength division multiplexer configured to receive the laser light from the plurality of wavelength tunable lasers and a phase modulator configured to receive multiplexed light from the wavelength division multiplexer. In a still further aspect, the system includes a plurality of sensors configured to receive the multiplexed light from the phase modulator.

In yet another aspect, the present apparatus may comprise a plurality of sensors, a detector, a first filter, at least a second filter, a third filter, and at least a fourth filter. In a further aspect, each sensor of the plurality of sensors includes a coiled portion of an optical fiber with at least two fiber Bragg grating opposite uncoiled segments adjacent the coiled portion of the optical fiber. A further aspect employs the detector to receive reflected light from the plurality of sensors and convert the reflected light into a first electrical signal and at least a second electrical signal. An additional aspect includes a first mixer and a second mixer to receive output from the detector and aid in generating the first electrical signal and the second electrical signal. In still another aspect, the first filter and the second filter receive a portion of the first electrical signal and output a first term and a second term from the first electrical signal, and the third filter and the fourth filter receive a portion of the second electrical signal and output a third term and a fourth term from the second electrical signal.

In accordance with another aspect, the present method includes emitting light from a laser into a coiled portion of an optical fiber. A further aspect includes reflecting light from the coiled portion to a photodetector, dividing an output from the photodetector into a first output and a second output, applying a first filter to a portion of the first output, applying a second filter to at least another portion of the first output, applying a third filter to a portion of the second output, and applying a fourth filter to at least another portion of the second output. In yet a further aspect, the first filter obtains a first term from the first output, the second filter obtains a second term from the first output, the third filter obtains a third term from the second output, and the fourth filter obtains a third term from the second output. In another aspect, a signal of interest, which induces a phase change, is extracted from the first term, the second term, the third term, and the fourth term.

The present systems, apparatuses, and methods are advantageous over prior constructions. For example, the present systems, apparatuses, and methods allow for high sensitivity and detection of small, higher-frequency signals, which are superimposed onto a larger, lower-frequency signal. The present systems, apparatuses, and methods also provide for omnidirectional response to acoustic signals; increased reliability and accuracy even when the spectrum of the sensor experiences large environmental drifts, such as temperature variations; capability for multiplexing; reduced sensitivity to laser polarization variations; and decreased costs. Additional advantages and features will be disclosed in the following description and claims as well as in the appended drawings.

DETAILED DESCRIPTION

The present systems, apparatuses, and methods demodulate fiber optic sensors. Such sensors are placed against a structure, such as an aircraft wing component, infrastructure bridges, power transmission structures, pipelines, and the like. The sensors are ideally suited for sensing ultrasonic acoustic signals to determine if any cracks or other undesirable structural characteristics are present in the structure adjacent to the sensor.

An exemplary sensor employed in the present system is a low-finesse Fabry-Perot interferometer ("FPI") formed by at least two FBGs on a coiled optical fiber. A uniform FBG contains a varied refractive index area with a spatial period, throughout a portion of a fiber core. A laser beam propagating in the fiber interacts with each grating plane such that only a portion of the laser beam, having a wavelength matched with a wavelength of the grating, is reflected and propagates in an opposite direction, while the remainder of the laser beam passes through this grating.

The sensor is mounted on a surface of a metal or composite structure to monitor the acoustic emission for health monitoring of the structure. Many of damage-related structural changes, such as crack initiation, crack growth, or fiber breakage, can generate acoustic emission, ultrasonic waves that travel along the structure. As the ultrasound travels to the sensor, the fiber in the sensor region is stretched and compressed according to the ultrasonic wave, which causes a phase change or shift of the spectral fringes. The ultrasonic waves may be evaluated by detecting the phase change or the spectral shift of the fringes of the sensor.

If the optical fiber has birefringence, the optical length of a fiber Fabry-Perot cavity is dependent on the polarization of the light that travels in the cavity. The overall fringes measured by a light can be considered as the superposition of the two set of fringes corresponding to the two principal polarization states. The fringes of low-finesse Fabry-Perot cavity are approximately sinusoidal. However, the phase delay of the light due to different optical path lengths of the two principal polarization states could cause the two sets of fringes to be misaligned in phase, and thus their superposition could be distorted from being sinusoidal. To prevent this, the diameter of the fiber coils and a length of the optical fiber in the cavity may be adjusted using $2m\pi$, where m is an integer. Where the phase delay of the light due to the different optical path lengths of the two principal polarization states is $2m\pi$, the two set of sinusoidal fringes are aligned in phase and their superposition would still be sinusoidal.

Figure 1:
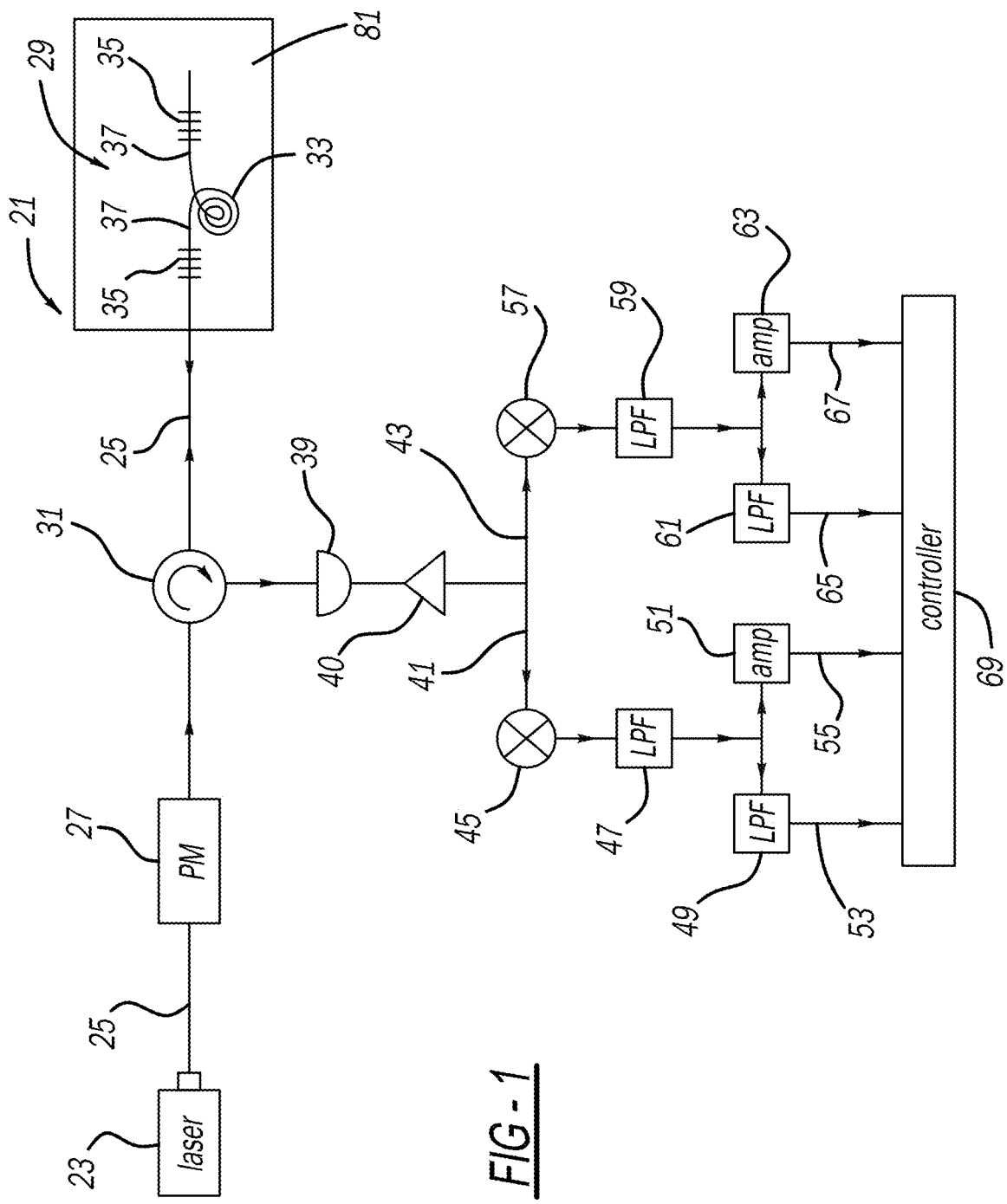
FIG. 1 is a circuit diagram showing a first embodiment of the present system.

A first embodiment of a sensor system 21 is illustrated in FIG. 1. A single-frequency laser 23 emits a beam of laser light into an optical fiber 25. Initially, the electrical field of the single-frequency laser 23 can be given as $$E = E_0 e^{j\omega t}, \qquad (1)$$

where $E_0$ is the electric field intensity of the laser; e is the natural exponential function; j is the unit imaginary number, which satisfies $j^2 = -1$; $\omega$ is the angular optical frequency of the laser, and t denotes time.

The beam of laser light is phase modulated with a sinusoidal wave whose frequency is at least a factor-of-two higher than the maximum frequency of a signal of interest by a phase modulator 27. In some embodiments, the signal of interest may be ultrasound having a frequency range of about 20 kHz to about 1 MHz. In other embodiments, the signal of interest can be defined or modified to suit a particular application or need.

The phase modulator 27 generates sidebands with a definite phase relationship from the single-frequency laser 23. The electric field of the phase-modulated beam of laser light can be given as $$E = E_0 e^{j\omega t + jM(\sin \Omega t)}, \qquad (2)$$

where $\Omega$ is the modulation frequency; and M is the phase modulation depth. Equation (2) can be re-written using Jacobi-Anger expansion as $$E = \Sigma_{k=-\infty}^{\infty} E_0 J_k(M) e^{j(\omega + k\Omega)t}. \qquad (3)$$

The beam of laser light from the phase modulator 27 is received by an optical interferometric sensor, such as a sensor 29, via an optical circulator 31. The sensor 29 includes a coiled portion 33 of the optical fiber 25 and at least two FBGs 35 on uncoiled portions 37 of the optical fiber 25. The FBGs 35 are positioned on uncoiled portions 37 of the optical fiber 25 on opposite sides of the coiled portion 35. As shown in FIG. 1, the sensor 29 is mounted on a structure 81. The coiled portion 33 of the sensor 29 provides a circular symmetry to the sensor 29 which allows for an omnidirectional response to signals, such as acoustic emission signals, sensed by the sensor 29. In some embodiments, the sensor 29 may be based on a Fabry-Perot interferometer, a Michelson interferometer, or a Mach-Zehnder interferometer.

The beam of laser light is reflected from the sensor 29 to a PD 39 via the optical circulator 31. The overall intensity of the reflected beam of laser light is detected by the PD 39. Because the sensor is a low-finesse FPI, it can be approximated by a two-beam interferometer, and the electrical field of the light reflected from the FPI is given by $$E_r = rE_0(e^{j\omega t + jM \sin \Omega t} + e^{j\omega(t-\tau) + jM \sin \Omega(t-\tau)}) \quad (4)$$

where r is the reflection coefficient of the FBGs 35 at the laser frequency, and τ is the time delay caused by the optical propagation of a round trip in the sensor 29. The PD 39 outputs an electric signal proportional to the overall power of the beam of laser light. The signal from the PD 39 consists of quadrature components with respect to the phase of the sensor fringes. The output of the PD 39 can be given as $$I \propto E_r E_r^* \quad (5)$$

where "*" represents a complex conjugate. The output of the PD 39 can be rewritten as $$I = A + B\cos\left[\omega\tau - 2M\sin(\Omega\tau)\cos\Omega\left(t - \frac{\tau}{2}\right)\right], \quad (6)$$

where A and B are constants related to the optical power of the single-frequency laser 23, the reflectivity of the FBGs 35, and the fringe visibility of the sensor 29. The signal of interest and environmental perturbations that affect the sensor 29 lead to changes of τ with time, which may be represented by Δτ(t). Thus, the output of the PD 39 provided in Equation (6) can be re-written as $$I = A + B\cos\left[\omega\tau_0 + \omega\Delta\tau(t) - 2M\sin\Omega(\tau_0 + \Delta\tau(t))\cos\Omega\left(t - \frac{\tau_0}{2} - \frac{\Delta\tau(t)}{2}\right)\right], \quad (7)$$

where $\tau_0$ is the initial time delay. In practical applications, the modulation frequency, Ω, is selected so that $\Omega\Delta\tau(t) \ll 1$ and $\sin\Omega\tau_0 \gg \sin\Omega\Delta\tau(t)$, so Equation (7) can be simplified as $$I = A + B\cos[C\cos\Omega t + \emptyset_0 + \Delta\emptyset(t)], \quad (8)$$

where $C = -2M\sin\Omega\tau_0$, $\emptyset_0$ is a quasi-static phase term including environmental effects, and $\Delta\emptyset(t)$ is an AC term containing the signal of interest. In Equation (s), a shift of $$\frac{\tau_0}{2}$$

to the time axis is implied. Equation (8) can be expanded in terms of Bessel functions as $$I = A + B[J_0(C) + 2\Sigma_{k=1}^{\infty}(-1)^k J_{2k}(C)\cos 2k\Omega t]\cos[\emptyset_0 + \Delta\emptyset(t)] - B[2\Sigma_{k=0}^{\infty}(-1)^k J_{2k+1}(C)\cos(2k+1)\Omega t]\sin[\emptyset_0 + \Delta\emptyset(t)], \quad (9)$$

where $\cos[\emptyset_0 + \Delta\emptyset(t)]$ and $\sin[\emptyset_0 + \Delta\emptyset(t)]$ are the in-phase and quadrature components containing the signal of interest.

The in-phase and quadrature components at a given carrier frequency allow the signal of interest to be obtained from the phase of the sensor fringes regardless of the relative position of the original laser line and the sensor fringes. The in-phase and quadrature components are modulated by carrier signals with frequencies of the even and odd multiples of Ω. For example, cos(Ωt) is an odd-order harmonic term with respect to the modulation frequency and cos(2Ωt) term is an even-order harmonic term with respect to the modulation frequency. The terms at carrier frequencies Ω and 2Ω, or $-2BJ_1(C)\sin[\emptyset_0 + \Delta\emptyset(t)]$ and $-2BJ_2(C)\cos[\emptyset_0 + \Delta\emptyset(t)]$ may be obtained by mixing the output from the PD 39 with sinusoidal signals at the same frequency and with appropriate phase and applying a LPF, which will be discussed below in more detail. In some embodiments, the odd-order harmonic term and the even-order harmonic term of the signal from the PD 39 may be acquired through homodyne detectors.

The output from the PD 39 is divided into at least two paths, such as a first path 41 and a second path 43. In some embodiments, the output from the PD 39 is split into the first path 41 and the second path 43 using a splitter 40. If the modulation frequency of the phase modulator and its harmonics are in the radio frequency ("RF") range, the splitter 40 may be an RF splitter. In some embodiments, the output from the PD 39 may be converted to a voltage signal prior to being split into the first path 41 and the second path 43. For example, a transimpedance amplifier may be used to convert the output of the PD 39 into a voltage signal and the splitter 40, in the form of an RF splitter with an input impedance that matches the output of the transimpedance amplifier, may be used to split the output into the first path 41 and the second path 43.

To obtain the signal of interest from the first path 41, a first mixer 45, a first low-pass filter ("LPF") 47, a second LPF 49, and a first amplifier 51 are used. The first mixer 45 is configured to multiply, or mix, the output of the PD 39 in the first path 41 with proper signals of the same frequency. For example, the first mixer 45 multiplies the output of the PD 39 in the first path 41, which is represented by Equation (9), with an odd-order harmonic term, such as cos(Ωt). The first LPF 47 is configured to receive output from the first mixer 45 and obtain a frequency component higher than an upper limit of a frequency of the signal of interest but much lower than the modulation frequency. For example, the first LPF 47 may obtain the cos(Ωt) term. The cos(Ωt) term is the term where k=0 in Equation (9), which is $-2BJ_1(C)\sin[\phi_0 + \Delta\phi(t)]$.

A portion of the output from the first LPF 47 is received by a second LPF 49 and another portion of the output from the first LPF 47 is received by a first amplifier 51. The second LPF 49 is configured to obtain a first term 53. The first term 53 obtained by the second LPF 49 may be lower than a lower limit of the frequency of the signal of interest but higher than the frequency that causes the quasi-dc/low-frequency shift of the fringes. Furthermore, the first amplifier 51 is configured to output a second term 55 containing the signal of interest, which has been amplified by the first amplifier 51. The first amplifier 51 may have a bandwidth matching a bandwidth of the signal of interest and be configured to amplify a portion of the output from the first LPF 47.

To obtain the signal of interest from the second path 43, a second mixer 57, a third LPF 59, a fourth LPF 61, and a second amplifier 63 are used. The second mixer 57 is configured to multiply the output of the PD 39 in the second path 43 with proper signals of the same frequency. For example, the second mixer 57 multiplies the output of the PD 39 in the second path 43, which is represented by Equation (9), with an even-order harmonic term, such as $\cos(2\Omega t)$. The third LPF 59 is configured to receive output from the second mixer 57 and obtain a frequency component higher than an upper limit of a frequency of the signal of interest but much lower than the modulation frequency. For example, the third LPF 59 may obtain the $\cos(2\Omega t)$ term. The $\cos(2\Omega t)$ term is the term where k=1 in Equation (9), which is $-2BJ_2(C)\cos[\phi_0+\Delta\tau(t)]$.

A portion of the output from the third LPF 59 is configured to be received by the fourth LPF 61 and another portion of the output from the third LPF 59 is configured to be received by the second amplifier 63. The fourth LPF 61 is configured to obtain a third term 65 containing the signal of interest. The third term 65 may be lower than a lower limit of the frequency of the signal of interest but higher than the frequency that causes the quasi-dc/low-frequency shift of the fringes. Moreover, the second amplifier 63 is configured to output a fourth term 67 containing the signal of interest. The second amplifier 63 may have a bandwidth matching a bandwidth of the signal of interest and be configured to amplify a portion of the output from the third LPF 59.

Additionally, a programmable controller, such as a controller 69, is configured to receive the first term 53, the second term 55, the third term 65, and the fourth term 67. The controller 69 includes an input, an output, a microprocessor, and a memory for storing and running software instructions. The controller 69 is also configured to extract the signal of interest from the first term 53, the second term 55, the third term 65, and the fourth term 67. If the phase change from the signal of interest is small, or $\Delta\emptyset(t)<<\pi/2$, the four terms may be represented by $$I_{1d}(t) = -2BJ_1(C)\sin\emptyset_0, \quad (10A)$$

$$I_{1c}(t) = -2BGJ_1(C)\cos\emptyset_0\Delta\emptyset(t), \quad (10B)$$

$$I_{2d}(t) = -2BJ_2(C)\cos\emptyset_0, \text{ and} \quad (10C)$$

$$I_{2c}(t) = -2BGJ_2(C)\sin\emptyset_0\Delta\emptyset(t), \quad (10D)$$

where G is the gain of the first amplifier 51 and the second amplifier 63 for the signal of interest. The value for $\Delta\emptyset(t)$ may be obtained by performing the following operation:

$$I_{1d}(t)I_{2c}(t) + I_{1c}(t)I_{2d}(t) = 4GB^2J_1(C)J_2(C)\Delta\emptyset(t), \quad (11)$$

where $\Delta\emptyset(t)$ is the phase change containing the signal of interest. In some embodiments, the signal of interest may be ultrasound having a frequency between about 20 kHz and about 1 MHz.

In summary, the present sensor system modulates the phase of the laser light emitted from a laser with a sinusoidal wave whose frequency is at least a factor-of-two higher than the highest frequency of a signal of interest, such as an ultrasonic frequency. A sensor receives the modulated laser light and reflects it to a PD. The PD outputs an electric signal proportional to the overall power of the reflected laser light. The output from the PD is separated into at least two paths, each path containing at least two filters and an amplifier. The filters and the amplifier are used to extract the signal of interest from the first path and the second path, resulting in at least four terms that can be used to reconstruct the phase change containing the signal of interest.

Figure 2:
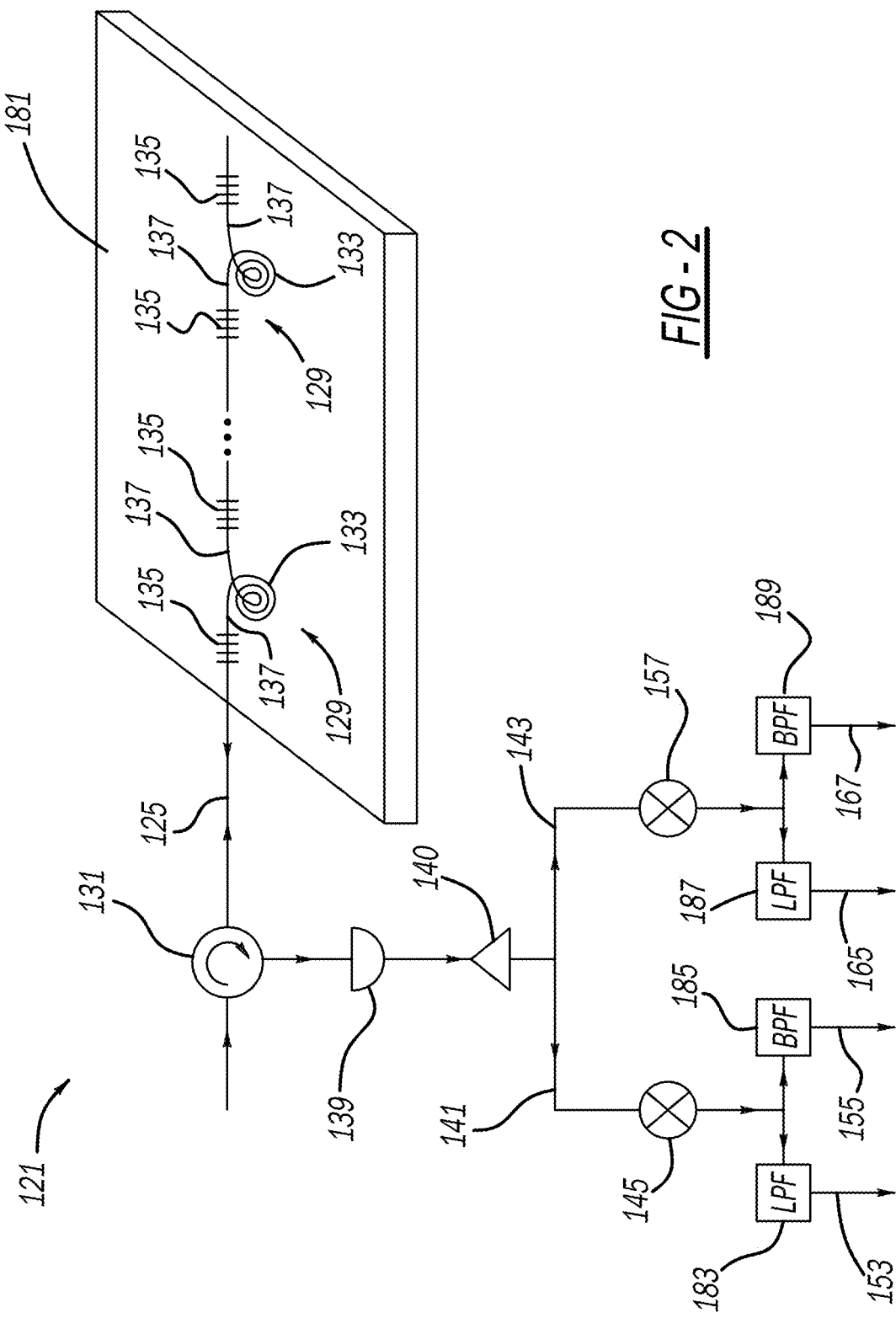
FIG. 2 is a circuit diagram showing a second embodiment of the present system.

A second embodiment of the present system 121 is illustrated in FIG. 2. Here, a plurality of sensors 129 are shown on a surface of a structure 181. The sensors 129 may be multiplexed. Similar to the sensor 29 shown in FIG. 1, each of the sensors 129 include a coiled portion 133 of an optical fiber 125 and at least two FBGs 135 on uncoiled portions 137 of the optical fiber 125. The FBGs 135 may be positioned on the uncoiled portions 137 of the optical fiber 125 on opposite sides of the coiled portion 133. In some embodiments, a center wavelength of the FBGs 135 associated with each of the sensors 129 is different. In other embodiments, the center wavelength of the FBGs 135 associated with each of the sensors 129 may be the same.

Similar to the embodiment shown in FIG. 1, a beam of laser light is emitted into the optical fiber 125 and received by the sensors 129 via an optical circulator 131. Laser light is reflected from at least one of the sensors 129 and directed to a PD 139 via the optical circulator 131. In some embodiments, laser light is reflected from only one of the sensor 129 and directed to the PD 139. The PD 139 outputs an electric signal proportional to the overall power of the laser light. The output from the PD 139 is divided into a first path 141 and at last a second path 143. In some embodiments, the output from the PD 139 may be split into the first path 141 and the second path 143 using a splitter 140. The splitter 140 may be similar to or the same as the splitter 40 described with respect to FIG. 1.

The first path 141 includes a first mixer 145, a first LPF 183, and a first band-pass filter ("BPF") 185. The first mixer 145 is configured to multiply, or mix, the output of the PD 139 in the first path 141 with proper signals of the same frequency. For example, the first mixer 145 may multiply the output of the PD 139 in the first path 141, which is represented by Equation (9), with an odd-order harmonic term, such as $\cos(\Omega t)$. The first LPF 183 receives a portion of the first path 141 from the first mixer 145 and filters the first path 141 to obtain a component below the minimum frequency of the signal of interest. For example, the first LPF 183 obtains a first term 153 from the first path 141 that is lower than a lower limit of the signal of interest but higher than the frequency that causes the quasi-dc/low-frequency drift of the fringes.

The first BPF 185 receives another shift of the first path 141 from the first mixer 145 and filters the first path 141 to obtain a component within the frequency range of the signal of interest. For example, the first BPF 185 obtains a second term 155 from the first path 141 similar to the signal of interest. In other embodiments, the first BPF 185 may be an amplifier with a bandwidth that matches a bandwidth of the signal of interest, such as the first amplifier 51 described with respect to FIG. 1 above, and be configured to amplify a portion of the first path 141 received from the first mixer 145 and output the second term 155 containing the signal of interest.

The second path 143 includes a second mixer 157, a second LPF 187, and a second BPF 189. The second mixer 157 is configured to multiply the output of the PD 139 in the second path 143 with proper signals of the same frequency. For example, the second mixer 157 may multiply the output of the PD 39 in the second path 143, which is represented by Equation (9), with an even-order harmonic term, such as $\cos(2\Omega t)$. The second LPF 187 receives a portion of the second path 143 from the second mixer 157 and filters the second path 143 to obtain a component below the minimum frequency of the signal of interest. For example, the second LPF 187 obtains a third term 165 that is lower than a lower limit of the signal of interest but higher than the frequency that causes the quasi-dc/low-frequency shift of the fringes.

The second BPF 189 receives another portion of the second path 143 from the second mixer 157 and filters the second path 143 to obtain a component within the frequency range of the signal of interest. For example, the second BPF 189 obtains a fourth term 167 similar to the signal of interest. In other embodiments, the second BPF 189 may be an amplifier with a bandwidth that matches the bandwidth of the signal of interest, such as the second amplifier 63 described with respect to FIG. 1 above, and be configured to amplify a portion of the second path 143 received from the second mixer 157 and output the fourth term 167 containing the signal of interest.

The first term 153, the second term 155, the third term 165, and the fourth term 167 are received by a processor and stored in a memory connected therewith. A communication interface may optionally be used to transmit date or receive commands from external networks to the processor.

Figure 3:
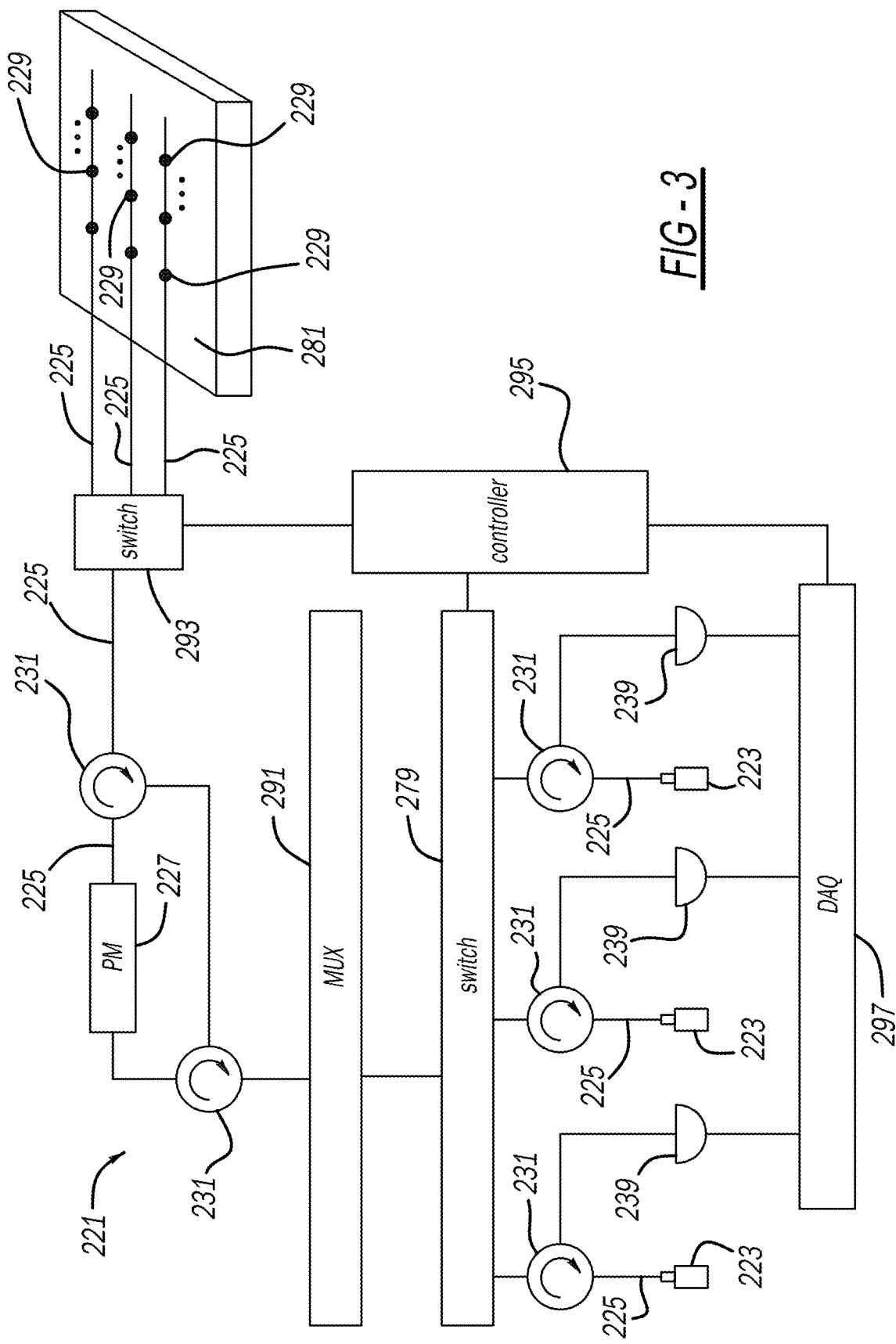
FIG. 3 is a circuit diagram showing a third embodiment of the present system.

A third embodiment of the present system 221 is shown in FIG. 3. The system 221 includes a plurality of wavelength tunable lasers 223, each configured to emit a beam of laser light to a plurality of sensors 229 positioned on a structure 281. Similar to the embodiments illustrated in FIG. 1 and FIG. 2, each of the sensors 229 include a coiled portion of an optical fiber 225 and at least two FBGs on uncoiled portions of the optical fiber 225. The FBGs may be positioned on uncoiled portions of the optical fiber on opposite sides of the coiled portion.

The plurality of wavelength tunable lasers 223 are each configured to match a wavelength of each of the plurality of sensors 229. Each beam of laser light emitted from the lasers 223 is configured to be received by a two-way M×N optical switch 279 and wavelength division multiplexer 291 and directed to a phase modulator 227. The phase modulator 227 modulates each beam of laser light before directing each beam of laser light to the sensors 229. The system 221 may also include a 1×N optical switch 293 between the phase modulator 227 and the plurality of sensors 229. The optical switch 293 is configured to direct beams of laser light to a plurality of optical fibers 225 having the plurality of sensors 229. In some embodiments, the system 221 may additionally comprise a set of controllers 295 configured to control the plurality wavelength tunable lasers 223, the two-way M×N optical switch 279, and the 1×N optical switch 293.

Each of the sensors 229 are configured to reflect the beams of laser light to a plurality of photodetectors 239. The beams of laser light reflected from the sensors 229 to the plurality of photodetectors 239 bypass the phase modulator 227 via at least one optical circulator 231. The wavelength division multiplexer 291 and the two-way M×N optical switch 279 separate and direct the reflected beams of laser light to one of the photodetectors 239 based on the wavelength of each of the reflected beams of laser light. Each of the photodetectors 239 output an electric signal proportional to the overall power of the beams of laser light. The signals from each of the photodetectors 239 are then filtered and processed in a similar manner described with respect to the embodiments shown in FIG. 1, discussed above. The resulting signals may be received by a data acquisition ("DAQ") system, such as a DAQ system 297, to be stored and analyzed. The DAQ system 297 may also be configured to transmit data to external networks and receive data and commands from external networks.

Figure 4:
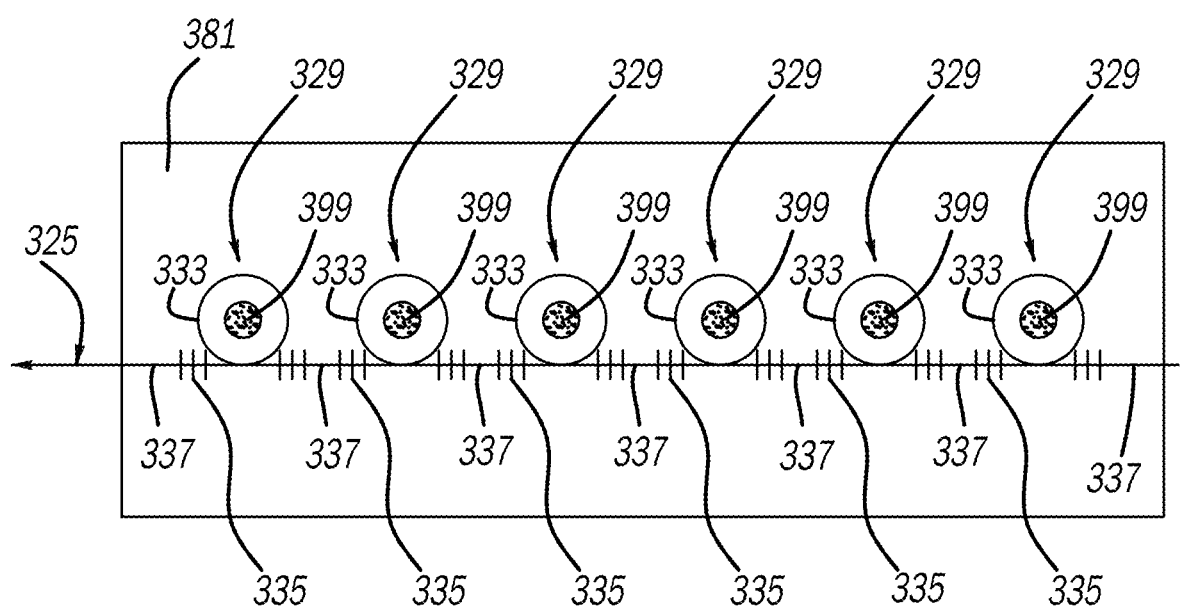
FIG. 4 is a circuit diagram showing a fourth embodiment of the present system.

FIG. 4 illustrates an embodiment of a plurality of sensors 329 positioned on a structure 381. The sensors 329 may be multiplexed together along at least one optical fiber 325. Each of the sensors 329 comprise a coiled portion 333 of the optical fiber 325 and at least two FBGs 335 on uncoiled portions 337 of the optical fiber 325. The FBGs 335 may be positioned on the uncoiled portions 337 of the optical fiber 325 on opposite sides of the coiled portion 333.

The coiled portion 333 of each of the sensors 329 is placed to surround a specific location, such as a critical or weak spot of the structure 381. For example, the coiled portion 333 is positioned around a fastener, such as a rivet 399. Such an arrangement enables the sensors 329 to monitor acoustic emission signals at these specific locations and allows for higher detection sensitivity to the acoustic emission signals at these specific locations.

A method for demodulating an acoustic emission sensor is also described. The method includes emitting a beam of light from a laser into a sensor associated with an optical fiber. The sensor may include a coiled portion of the optical fiber and uncoiled portions of the optical fiber adjacent the coiled portion. The sensor may also include at least two FBGs on opposite uncoiled segments adjacent the coiled segment of the optical fiber.

The method further includes reflecting light from the sensor to a photodetector and dividing an output from the photodetector into a first output and a second output. The method also includes applying a first filter to a portion of the first output and applying a second mixer to at least another portion of the second output. The first mixer and the second mixer may be configured to generate cosine and sine terms of the phase of the sensor. Additionally, the method includes applying a first filter to a portion of the first output received from the first mixer, applying a second filter to at least another portion of the first output received from the first mixer, applying a third filter to a portion of the second output received from the second mixer, and applying a fourth filter to at least another portion of the second output received from the second mixer. The first filter is configured to obtain a first term from the first output, the second filter is configured to obtain a second term from the first output, the third filter is configured to obtain a third term from the second output, and the fourth filter is configured to obtain a third term from the second output. In some embodiments, the second filter may be a first amplifier configured to obtain the second term from the first output and the fourth filter may be a second amplifier configured to obtain the fourth term from the second output.

The method additionally comprises obtaining a signal of interest from the first term, the second term, the third term, and the fourth term. For example, a programmable controller may be used to extract the signal of interest from the first term, the second term, the third term, and the fourth term. In some embodiments, the signal of interest is ultrasound.

While various embodiments of the present invention have been disclosed, it should also be appreciated that other variations may be employed. For example, additional or alternate optical components may be included in the present system; however, many of the performance advantages may not be achieved. It is alternately envisioned that alternate lasers or modulator may be utilized, although some of the preferred advantages may not be realized. Furthermore, while two amplifiers and four filters have been disclosed, a greater quantity may alternately be employed. It should also be appreciated that any of the preceding embodiments and features thereof can be mixed and matched with any of the others in any combination depending upon the final product and processing characteristics desired. Variations are not to be regarded as a departure from the present disclosure, and all such modifications are intended to be included within the scope and spirit of the present invention.

The invention claimed is:

1. A sensor system comprising:
an optical fiber;
a laser configured to emit a laser beam into the optical fiber;
a phase modulator, coupled to the optical fiber, configured to receive the laser beam;
a sensor configured to receive the laser beam from the phase modulator, the sensor comprising a coiled portion of the optical fiber with at least two gratings located on opposite uncoiled segments adjacent the coiled portion of the optical fiber;
a photodetector configured to receive a reflected portion of the laser beam from the sensor;
a splitter configured to receive an output from the photodetector and divide the output into a first route and a second route;
a first filter configured to receive a portion of the first route and output a first sub-output and at least a second sub-output;
a second filter configured to receive a portion of the first sub-output from the first filter and being configured to output a first term;
a first amplifier configured to receive a portion of the at least a second sub-output and being configured to obtain a second term;
a third filter configured to receive a portion of the second path and being configured to divide the second path into a third sub-output and at least a fourth sub-output;
a fourth filter configured to receive a portion of the third sub-output from the third filter and being configured to output a third term;
a second amplifier configured to receive a portion of the at least a fourth sub-output from the third filter and being configured to obtain a fourth term; and
a controller configured to receive the first term, the second term, the third term, and the fourth term in order to assist with sensing.

2. The sensor system of claim 1, further comprising a splitter configured to receive a signal from the photodetector, associated with the reflected portion, and divide the signal into the first path route and at least the second path route.

3. The sensor system of claim 2, wherein the splitter comprises a radio-frequency splitter.

4. The sensor system of claim 2, further comprising a first mixer configured to receive at least a portion of the signal associated with the first route and a second mixer configured to receive at least a portion of the signal associated with the second route.

5. The sensor system of claim 4, wherein the first mixer is configured to multiply an output of the photodetector associated with the first route, with an odd-order harmonic term, and the second mixer is configured to multiply an output of the photodetector associated with the second route, with an even-order harmonic term.

6. The sensor system of claim 1, wherein the first term, the second term, the third term, and the fourth term each contain phase information encoded by a signal of interest.

7. The sensor system of claim 6, wherein the signal of interest is ultrasound.

8. The sensor system of claim 6, wherein the signal of interest is between about 20 KHz and about 1 MHz.

9. The sensor system of claim 1, wherein the controller is configured to extract a signal of interest from the first term, the second term, the third term, and the fourth term.

10. The sensor system of claim 9, wherein the signal of interest is ultrasound having a frequency between about 20 KHz and about 1 MHz.

11. The sensor system of claim 1, wherein the sensor comprises a plurality of sensors.

12. The sensor system of claim 1, wherein the sensor comprises a plurality of multiplexed sensors.

13. The sensor system of claim 1, wherein the first filter, the second filter, the third filter, and the fourth filter each comprise low-pass filters.

14. A sensor apparatus comprising:
a plurality of sensors, each sensor of the plurality of sensors comprising a coiled portion of an optical fiber with at least two gratings on opposite uncoiled segments adjacent the coiled portion of the optical fiber;
a detector configured to receive reflected light from the plurality of sensors and convert the reflected light into a first electrical signal and at least a second electrical signal;
a first filter configured to receive a portion of the first electrical signal and being configured to output a first term from the first electrical signal;
at least a second filter configured to receive at least another portion of the first electrical signal and being configured to output a second term from the first electrical signal;
a third filter configured to receive a portion of the at least a second electrical signal and being configured to output a third term from the second electrical signal; and
at least a fourth filter configured to receive at least another portion of the at least a second electrical signal and being configured to output a fourth term from the at least a second electrical signal.

15. The sensor apparatus of claim 14, further comprising a controller configured to receive the first term, the second term, the third term, and the fourth term, the controller configured to:
(a) extract a signal from the first term, the second term, the third term, and the fourth term; and
(b) make a structural health determination of a structure on which the plurality of sensors are attached based on the signal.

16. The sensor apparatus of claim 14, wherein:
the first filter and the third filter each comprise a low-pass filter;
the second filter comprises a first amplifier; and
the fourth filter comprises a second amplifier.

17. The sensor apparatus of claim 14, wherein the second filter and the fourth filter each comprise a band-pass filter.

18. A sensor system comprising:
a plurality of wavelength tunable lasers each being configured to emit a laser light;
a wavelength division multiplexer configured to receive the laser light from the plurality of wavelength tunable lasers;
a phase modulator configured to receive multiplexed light from the wavelength division multiplexer; and
a plurality of sensors configured to receive the multiplexed light from the phase modulator, each of the plurality of sensors comprising a coiled portion of an optical fiber with at least two fiber gratings on opposite uncoiled segments adjacent the coiled portion of the optical fiber;

at least one circulator configured to receive reflected light from the plurality of sensors and being configured to direct the reflected light to the wavelength division multiplexer;

a plurality of photodetectors configured to receive the reflected light from the wavelength division multiplexer according to a wavelength of the reflected light;

a plurality of splitters associated with each of the plurality of photodetectors and configured to receive an output from the plurality of photodetectors, each splitter of the plurality of splitters being configured to divide the output received from each of the plurality of photodetectors into a first path and at least a second path;

wherein the first path comprises,
- (a) a first mixer configured to receive a portion of a first signal of the first path and multiply the output from the photodetector in the first path with an odd-order harmonic term;
- (b) a first filter configured to receive a portion of the first signal of the first path from the first mixer and being configured to divide the first signal of the first path into a first sub-output and at least a second sub-output;
- (c) a second filter configured to receive a portion of the first sub-output from the first filter and being configured to output a first term;
- (d) a first amplifier configured to receive a portion of the at least a second sub-output; and wherein the second path comprises,
- (a) a second mixer configured to receive a portion of a second signal of the second path and multiply the output from the photodetector in the second path with an even-order harmonic term;
- (b) a third filter configured to receive a portion of the second signal of the second path from the second mixer and being configured to divide the second signal of the second path into a third sub-output and at least a fourth sub-output;
- (c) a fourth filter configured to receive a portion of the third sub-output from the third filter and being configured to output a third term;
- (d) a second amplifier configured to receive a portion of the at least a fourth sub-output from the third filter; and a controller receiving the first term, the second term, the third term, and the fourth term, the controller configured to extract a signal from the first term, the second term, the third term, and the fourth term.

19. The sensor system of claim 18, wherein each splitter of the plurality of splitters comprises a radio-frequency splitter.

20. A method for sensing, the method comprising:
emitting light from a laser into a coiled portion of an optical fiber, the optical fiber comprising at least two fiber gratings adjacent to the coiled portion;
reflecting light from the coiled portion to a photodetector;
dividing an output from the photodetector into a first output and a second output;
applying a first filter to a portion of the first output, the first filter configured to obtain a first term from the first output;
applying a second filter to at least another portion of the first output, the second filter configured to obtain a second term from the first output;
applying a third filter to a portion of the second output, the third filter configured to obtain a third term from the second output; and
applying a fourth filter to at least another portion of the second output, the fourth filter configured to obtain a fourth term from the second output.

21. The method of claim 20, wherein the splitter comprises a radio-frequency splitter.

22. The method of claim 20, further comprising ultrasound encoding phase information in the first term, the second term, the third term and the fourth term.

23. The method of claim 20, further comprising encoding phase information in the first term, the second term, the third term and the fourth term, with a signal of interest which is between 20 KHz and about 1 MHz.

24. The method of claim 20, further comprising multiplexing together a plurality of sensors along the optical fiber, each of the sensors comprising the coiled portion of the optical fiber and the at least two fiber gratings on uncoiled portions of the optical fiber.

25. The method of claim 20, further comprising surrounding a specific location of a fastener with the coiled portion of the optical fiber, and monitoring acoustic emission signals at the specific location via detecting a phase change or a spectral shift.

26. The method of claim 20, further comprising surrounding weak spot of a structure with the coiled portion of the optical fiber, and monitoring acoustic emission signals at the weak spot via detecting a phase change or a spectral shift.

* * * * *